(12) United States Patent
Eldon (10) Patent No.: US 9,219,857 B2
(45) Date of Patent: Dec. 22, 2015

(54) IMAGE CAPTURE

(75) Inventor: James Eldon, Fleet Hants (GB)

(73) Assignee: Nokia Technologies Oy, Espoo (FI)

( * ) Notice: Subject to any disclaimer, the term of this patent is extended or adjusted under 35 U.S.C. 154(b) by 1034 days.

(21) Appl. No.: 13/333,284

(22) Filed: Dec. 21, 2011

(65) Prior Publication Data
US 2013/0162837 A1 Jun. 27, 2013

(51) Int. Cl.
*H04N 5/232* (2006.01)
*H04N 5/345* (2011.01)

(52) U.S. Cl.
CPC ......... *H04N 5/23219* (2013.01); *H04N 5/3454* (2013.01)

(58) Field of Classification Search
None
See application file for complete search history.

(56) References Cited

U.S. PATENT DOCUMENTS

| 2004/0100560 A1 | 5/2004 | Stavely et al. |
| 2005/0200735 A1 | 9/2005 | Shiba |
| 2008/0225130 A1 | 9/2008 | Paaaho et al. |
| 2010/0271485 A1 | 10/2010 | Kim |
| 2011/0051991 A1* | 3/2011 | Neuman et al. ............... 382/100 |
| 2011/0254950 A1* | 10/2011 | Bibby et al. .................. 348/135 |

FOREIGN PATENT DOCUMENTS

WO WO 02/37179 A2 5/2012

OTHER PUBLICATIONS

Hartley, et al., "Multiple View Geometry in Computer Vision", Chapter 4 "Estimation—2D Projective Transformations", (Nov. 2003), (pp. 87-131).

* cited by examiner

*Primary Examiner* — William C Vaughn, Jr.
*Assistant Examiner* — Eileen Adams
(74) *Attorney, Agent, or Firm* — Harrington & Smith (57) ABSTRACT

An apparatus including a processor configured to change automatically which pixels are used to define a target captured image in response to relative movement of a sensor frame of reference defined by a camera sensor and an image frame of reference defined by the image.

17 Claims, 5 Drawing Sheets

FIG. 10B

IMAGE CAPTURE

TECHNOLOGICAL FIELD

Embodiments of the present invention relate to image capture.

BACKGROUND

Digital camera sensors are now used for image capture in portable electronic apparatuses such as portable cameras and mobile cellular telephones.

A digital camera sensor captures an image as a plurality of pixels.

BRIEF SUMMARY

According to various, but not necessarily all, embodiments of the invention there is provided an apparatus comprising: a processor configured to change automatically which pixels are used to define a target captured image in response to relative movement of:
 a sensor frame of reference, defined by a camera sensor; and
 an image frame of reference, defined by the image.

According to various, but not necessarily all, embodiments of the invention there is provided a method comprising: detecting relative movement of a sensor frame of reference defined by the camera sensor and an image frame of reference defined by the image; and in response to detected relative movement, changing automatically which pixels are used to define a target captured image.

According to various, but not necessarily all, embodiments of the invention there is provided a method comprising: automatically tracking an area of interest such that it remains within a target captured image by controlling which subset of available pixels are used to define the target captured image.

BRIEF DESCRIPTION

For a better understanding of various examples of embodiments of the present invention reference will now be made by way of example only to the accompanying drawings in which.

DETAILED DESCRIPTION

The Figures illustrate an apparatus 2 configured to change automatically which pixels are used to define a target captured image 60 in response to relative movement of a sensor frame of reference 44 defined by a camera sensor 10 and an image frame of reference 56 defined by the image 32.

A target captured image 60 may be a still image such as a photograph or may be a video frame. A video frame is an image in a series of images (the video). A photograph may be an isolated image or may be an image in a series of images (e.g. a burst of photographs).

A frame of reference is a reference frame used for the purpose of determining relative motion. The sensor frame of reference 44 may be a reference frame fixed in relation to the camera sensor 10. The image frame of reference 56 may be a reference frame fixed in relation to a portion of a scene being imaged, such as for example, an area of interest 30 that is being tracked.

The area of interest 30 may be defined manually or automatically. It may, for example, be an object that is to be tracked in a series of target captured images 60 as it moves relative to the camera sensor 10. The area of interest 30 is tracked so that it is captured, despite the relative movement, in a series of target captured images 60.

Capturing an image comprises creating an addressable data structure recording the image. The data structure is stored in a memory, for subsequent retrieval. Capturing an image should be contrasted with transiently displaying an image, for example in a viewfinder display, for review in advance of capture where an addressable data structure is not created and stored in a memory, for subsequent retrieval.

In some embodiments, the area of interest 30 is tracked using transverse tracking. In transverse tracking a field of view for a target captured image 60 remains constant, however, the position of the field of view tracks transversely (i.e. anywhere in a two-dimensional plane parallel to the plane of the camera sensor 10). As the field of view remains constant the size of portions of a scene captured in successive target captured images 60 remains constant but the positions of the portions change.

In some embodiments, in addition or as an alternative to transverse tracking, the area of interest 30 is tracked using depth tracking. In depth tracking a field of view for a target captured image 60 increases as the area of interest 30 approaches and decreases as the area of interest 30 become more distant. This change in the field of view maintains a constant ratio (scale) between the field of view and a size of the target captured image 60. The pixel count may be kept constant despite changes in the size of the field of view.

Some embodiments, enable 'select, point and shoot' video recording in which a user defines the area of interest 30 (select), generally points the camera sensor 10 in the direction of the defined area of interest 30 and captures video 60. Automatic transverse tracking may keep the area of interest 30 centrally located in successive video frames 60, despite the camera sensor 10 only pointing generally towards the area of interest 30 and despite movement of the area of interest 30. Automatic depth tracking, if used, may keep the area of interest 30 in the same proportion to the video frame 60, despite movement of the area of interest 30 towards or away from the camera sensor 10.

Some embodiments, enable 'point and shoot' video recording in which a user generally points the camera sensor 10 in a direction of interest and captures video 60. The area of interest 30 is automatically defined (select). Automatic transverse tracking may keep the area of interest 30 centrally located in successive video frames 60, despite the camera sensor 10 only pointing generally towards the area of interest 30 and despite movement of the area of interest 30. Automatic depth tracking, if used, may keep the area of interest 30 in the same proportion to the video frame 60, despite movement of the area of interest 30 towards or away from the camera sensor 10.

Thus an object 30 may be tracked automatically while recording video 60 such that the object 30 is automatically positioned within each captured video frame 60. If an object 30 is being videoed moves relative to a camera sensor 10 while the camera sensor 10 is recording video 60, then pixels used to define the video frames 60 automatically change so that the object 60 being videoed is tracked and remains prominently, perhaps centrally, positioned in the video frames 60 as recorded (captured) and as displayed on a viewfinder display. When the video is played back, the tracked object 30 will be presented in a substantially static foreground in front of a moving background.

In some embodiments, it may be a necessary condition that video recording is in progress before there is any automatic change of which pixels are used to define a target captured image 60.

Some embodiments, enable an object to be tracked automatically before an still image is captured. When the still image is captured, the object has been automatically positioned within the captured still image.

Figure 1:
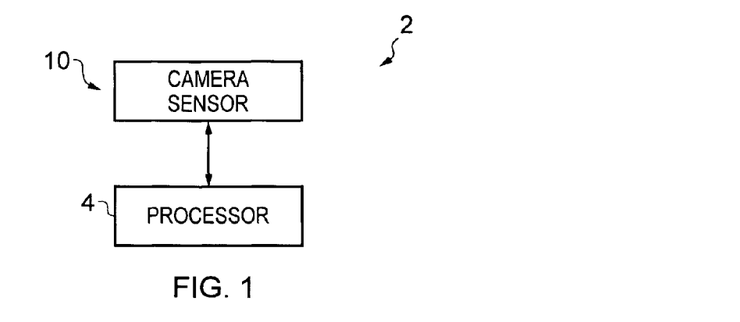
FIG. 1 schematically illustrates an example of an apparatus comprising a processor and a camera sensor.

FIG. 1 schematically illustrates an apparatus 2 comprising a processor 4 and a camera sensor 10.

The camera sensor 10 is configured to capture an image as a plurality of pixels.

A pixel is a picture element. Pixels may be monochrome pixels or color pixels. A monochrome pixel typically has an intensity value for a single parameter e.g. grayscale. A color pixel typically has an intensity value for each of a number of different parameters that span a multi-color color space. As an example, for a red-green-blue color space, a pixel is defined by a red intensity (R), a green intensity (G) and a blue intensity (B).

The camera sensor 10 comprises sensor elements. When an image is captured by the camera sensor 10, each sensor element provides a pixel of the image.

A sensor element may be a monochrome sensor element for capturing a monochrome pixel or a color sensor element for capturing a color pixel.

A monochrome sensor element typically detects an intensity value for a single parameter.

A color sensor element may have a number of sub-elements each of which detects an intensity value for one of the number of different parameters that span the color space. As an example, for a red-green-blue color space, a sensor element may comprise as sub-elements a red light detector that detects an intensity of red light (R), a green light detector that detects an intensity of green light (G), and a blue light detector that detects an intensity of blue light (B).

The camera sensor 10 has a very high pixel count, that is, it comprises a very high number of sensor elements.

FIGS. 4B, 5B, 6B and 7B schematically illustrates a camera sensor 10 in which the sensor elements 42 are arranged in a fixed array 40. The Figures include a grid of N rows and M columns and a sensor element 42 is positioned where each row and column cross.

The illustrated camera sensor 10 is a reduced size camera sensor. The actual camera sensor 10 used in the apparatus 2 may have a pixel count (number of sensor elements 42) in excess of 30 million. In one embodiment, the camera sensor 10 comprises 40 million sensor elements 42.

Referring to FIGS. 4A, 5A, 6A and 7A, an image 32 from the real-world is captured as an array of pixels 52 using the array 40 of sensor elements 42. The captured image 50 is illustrated in FIGS. 4C, 5C, 6C and 7C.

Figure 4A:
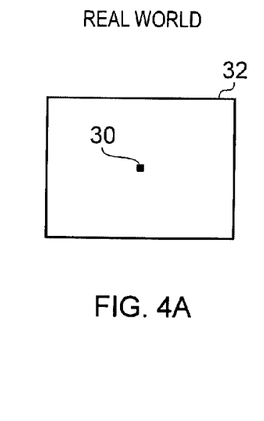
FIGS. 4A, 4B, 4C, 4D illustrate examples of notional stages in creating a target captured image at a first time according to a first embodiment.
Figure 4B:
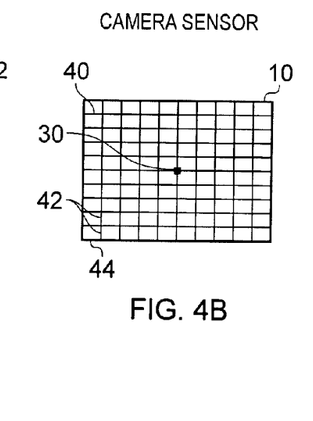
Figure 4C:
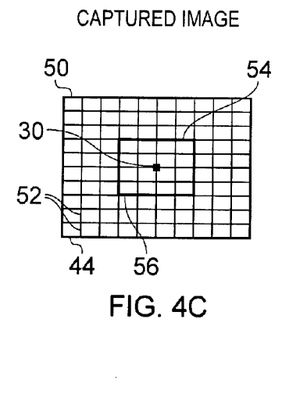
Figure 4D:
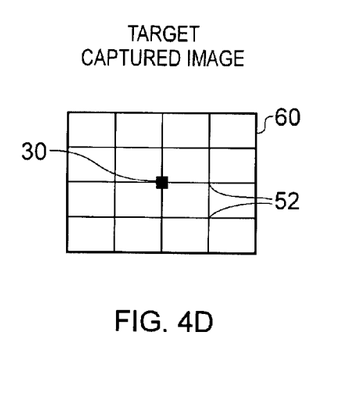
Figure 5A:
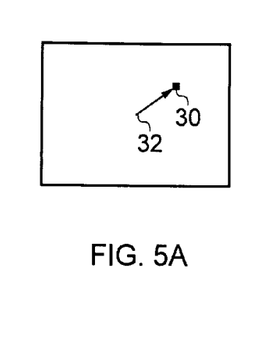
FIGS. 5A, 5B, 5C, 5D illustrate examples of notional stages in creating a target captured image at a second time according to the first embodiment.
Figure 5B:
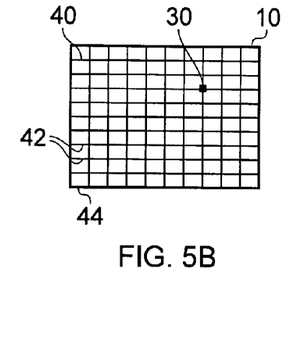
Figure 5C:
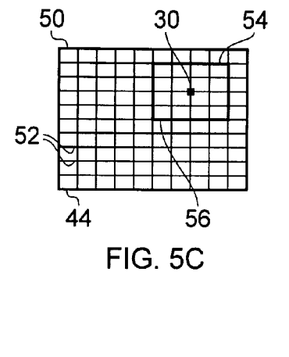
Figure 5D:
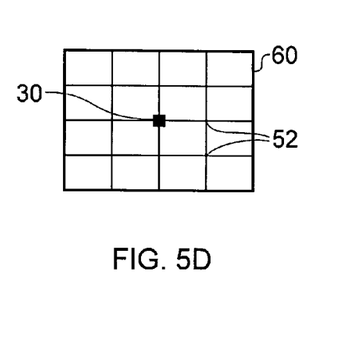

In FIGS. 4C and 5C, the whole of the array 40 of sensor elements 42 is used to capture the captured image 50. As the array 40 is a N row by M column array of sensor elements 42, the captured image 50 is a N row by M column array of pixels 52. A sub-set 54 of the captured image 50 is used to define a target captured image 60 (FIGS. 4D and 5D). Whereas a whole scene is captured in the captured image 50 by the whole array 40 of sensor elements 42, the sub-set 54 of the captured image 50 has a reduced field of view and defines only a portion of the scene.

Figure 6A:
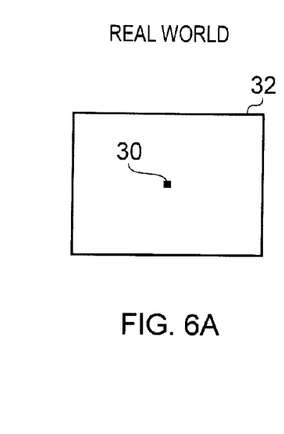
FIGS. 6A, 6B, 6C, 6D illustrate examples of notional stages in creating a target captured image at a first time according to a second embodiment.
Figures 6B, 6C:
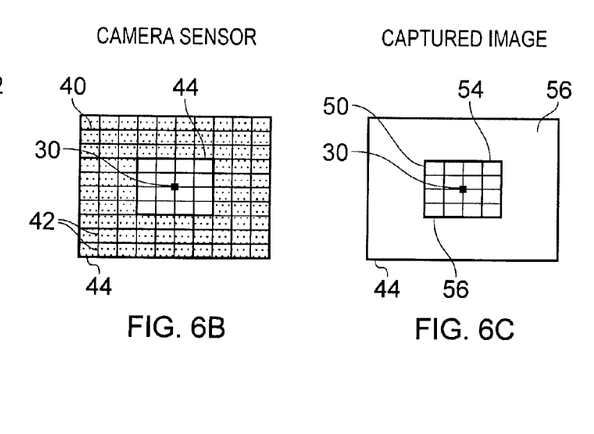
Figure 6D:
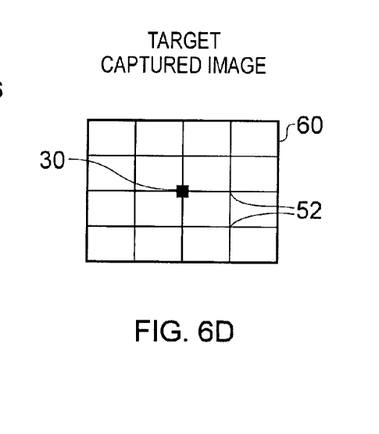
Figure 7A:
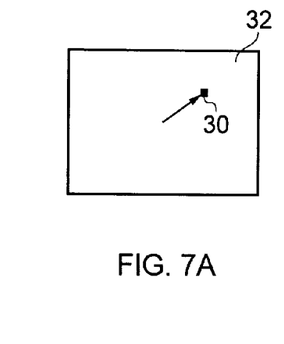
FIGS. 7A, 7B, 7C, 7D illustrate examples of notional stages in creating a target captured image at a second time according to the second embodiment.
Figures 7B, 7C, 7D:
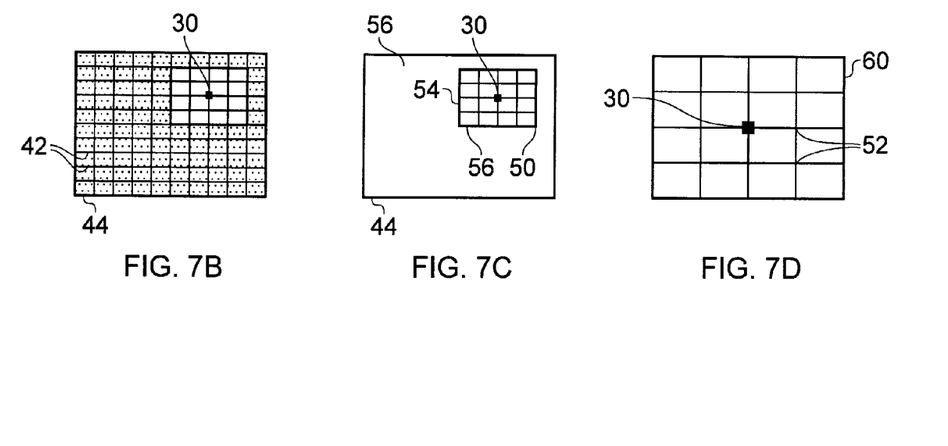

In FIGS. 6C and 7C, a sub-set 44 of the whole of the array 40 of sensor elements 42 is used to capture the captured image 50. As the sub-set 44 of the array 40 is a n row by m column array of sensor elements 42, the captured image 50 is a n row by m column array of pixels 52. The captured image 50 is used as the target captured image 60 (FIGS. 6D and 7D). Whereas the whole array 40 of sensor elements 42 capture a whole scene, the sub-set 44 has a reduced field of view and defines only a portion of the scene.

The processor 4 is configured to change automatically which pixels 52 are used to define a target captured image 60.

As can be better understood from FIGS. 4A to 7D, the change in which pixels are used to define a target captured image 60 is in response to relative movement of a sensor frame of reference 44 defined by a camera sensor 10 and an image frame of reference 56 defined by the image 32.

The sensor frame of reference 44 is a reference frame that is fixed to and moves with the camera sensor 10. In FIGS. 4B, 5B, 6B and 7B the origin where the M=0 row and N=0 column meet is one arbitrary example of a sensor frame of reference 44.

The image frame of reference 56 is a reference frame that is fixed to and moves with the scene being captured. In FIGS. 4B, 5B, 6B and 7B the sensor frame of reference 44 is fixed to an area of interest 30.

The processor 4 is configured to automatically track the area of interest 30 when it moves relative to the camera sensor 10 by dynamically controlling which subset 54 of pixels 52 is used to define the target captured image 60. The processor 4 may perform transverse tracking which automatically ensures that the area of interest 30 remains within a target captured image 60, perhaps at a constant position within the target captured image 60. The processor 4 may additionally or alternatively perform depth tracking which ensures that the area of interest 30 remains at a constant scale relative to the target captured image 60.

Relative movement of the area of interest 30 and the camera sensor 10 may occur in various different ways. It may, for example, occur when an object in the area of interest 30 is moving while the apparatus 2 remains stationary. Tracking keeps the area of interest 30 within the target captured image 60 despite relative movement of the sensor frame of reference 44 and the image frame of reference 56. The area of interest 30 may in some embodiments be kept at a constant position within the target captured image 60, for example at the centre of the target captured image 60.

Figure 2:
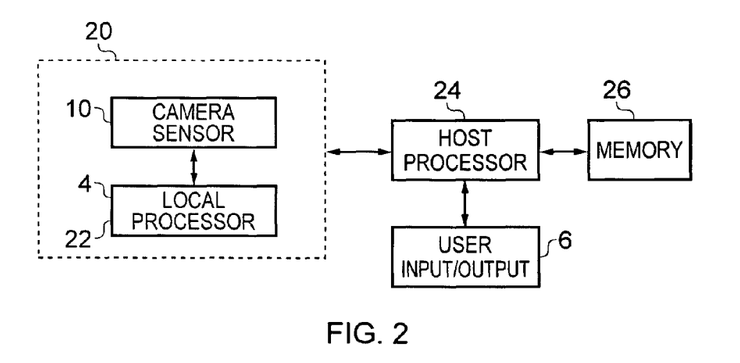
FIG. 2 illustrates an example of an apparatus comprising a camera sensor and a processor housed in a hardware module.

FIG. 2 illustrates an apparatus 2 comprising a camera sensor 10 and a processor 4 as previously described. In this example, processor 4 is a local processor 22 that is housed in a hardware module 20 along with the camera sensor 10.

The module 20 is part of a larger host apparatus 2. The host apparatus 2 comprises the module 20, a host processor 24, a memory 26 and user input and user output 6.

The host processor 24 is configured to read from and write to the memory 26. It is also configured to receive input commands from the user input 6 and provide output commands to the user output 6. The host processor 24 is also configured to communicate with the module 20.

The host processor 24 may be a multi-functional processor such as, for example, a central processing unit.

In this example, the functions of the processor 4 are performed by only the local processor 22.

In other implementations, the functions of the processor 4 may be performed by only the host processor 22.

In still other implementations, the functions of the processor 4 may be performed by the host processor 22 and the local processor 22.

Figure 3:
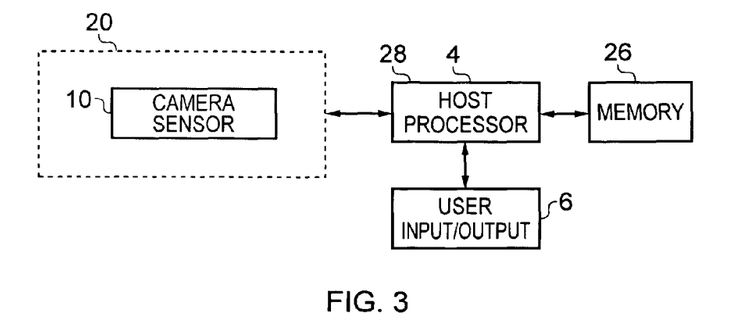
FIG. 3 illustrates an example of an apparatus comprising a camera sensor housed in a hardware module and a processor.

FIG. 3 illustrates an apparatus 2 comprising a camera sensor 10 and a processor 4 as previously described. In this example, processor 4 is a host processor 28.

The camera sensor 20 is housed in a hardware module 20 without a local processor and separate to the host processor 28.

The module 20 is part of a larger host apparatus 2. The host apparatus 2 comprises the module 20, a host processor 28, a memory 26 and user input and user output 6.

The host processor 28 is configured to read from and write to the memory 26. It is also configured to receive input commands from the user input 6 and provide output commands to the user output 6. The host processor 28 is also configured to communicate with the module 20.

The host processor 28 may be a multi-functional processor such as, for example, a central processing unit.

In this example, the functions of the processor 4 are performed by only the host processor 28.

Referring to FIGS. 1, 2 and 3, the area of interest 30 may be defined by a user or may be defined automatically.

User definition may be achieved by capturing and displaying the image 32 and enabling a user to select a portion of the image 32 using a user input 6.

The apparatus 2 may for example enable user-selection of an object 30 within the image 32. For example, the image 32 may be displayed on a touch sensitive display 6 and the user may select an object 30 by touching a portion of the touch-sensitive display corresponding to the object 30.

The apparatus 2 may for example enable user-selection of a portion 30 within the image 32. For example, the image 32 may be displayed on a touch sensitive display 6 and the user may select the image portion 30 by tracing a frame around the portion of image displayed on the touch-sensitive display 6.

The apparatus 2 may for example enable user-selection of a portion 30 within the image 32. For example, the portion 30 may for example correspond to a portion of the image used for auto-focusing.

In the embodiment described with reference to FIGS. 4A to 5D, when there is relative movement of the sensor frame of reference 44 and the image frame of reference 56, the processor 4 dynamically controls which sub-set 54 of pixels 52 of a captured image 50 are used to define a smaller target captured image 60.

FIG. 4A represents an image 32 of the real-world at a first time.

FIG. 4B illustrates that all of the sensor elements 42 of the N row by M column array 40 of contiguous sensor elements 42 are operational. The camera sensor 10 captures the image 32. The captured image 50 is illustrated in FIG. 4C.

FIG. 4C illustrates that the processor 4 can automatically select a sub-set 54 of the pixels 52 such that an area of interest 30 is included in the sub-set 54. In this example, the sub-set 54 is an array of $n_1$ rows and $m_1$ columns of pixels 52 positioned at $(x_1, y_1)$ and providing a field of view $X_1 \times Y_1$. The sub-set 54 has a pixel count of $n_1 * m_1$.

FIG. 4D illustrates that the sub-set 54 of the pixels defines the target captured image 60. If the target captured image 60 is displayed on the same display as the captured image 50 then it has an effective zoom of $M/m_1$ ($=N/n_1$).

FIG. 5A represent an image 32 of the real-world at a second time shortly after the first time. The area of interest 30 has moved between the first time and the second time.

FIG. 5B illustrates that all of the sensor elements 42 of the N row by M column array 40 are operational. The camera sensor 10 captures the image 32. The captured image 50 is illustrated in FIG. 4C.

FIG. 5C illustrates that the processor 4 can automatically select a new sub-set 54 of the pixels 52 such that the area of interest 30 is included in the sub-set 54 despite having moved. The sub-set is an array of $n_2$ rows and $m_2$ columns of pixels 52 positioned at $(x_2, y_2)$ with a field of view $X_2 \times Y_2$. The sub-set 54 has a pixel count of $n_2 * m_2$.

If the processor 4 performs transverse tracking only, then $n_1 = n_2$, $m_1 = m_2$, $X_1 = X_2$, $Y_1 = Y_2$, and $(x_1, y_1) \neq (x_2, y_2)$. The sub-set 54 remains the same size (same field of view), has the same resolution (same pixel count) but is repositioned.

If the processor 4 performs depth tracking only, then $X_1 \neq X_2$, $Y_1 \neq Y_2$, $X_1/Y_1 = X_2/Y_2$ and $(x_1, y_1) = (x_2, y_2)$. The sub-set 54 remains at the same position but is re-sized (different field of view) while maintaining the same aspect ratio. The pixel count may remain the same $n_1 = n_2$, $m_1 = m_2$.

If the processor 4 performs transverse tracking and depth tracking, then $X_1 \neq X_2$, $Y_1 \neq Y_2$, $X_1/Y_1 = X_2/Y_2$ and $(x_1, y_1) \neq (x_2, y_2)$. The sub-set 54 changes size (different field of view) and is repositioned. The pixel count may remain the same $n_1 = n_2$, $m_1 = m_2$.

FIG. 5D illustrates that the new sub-set 54 of the pixels defines the target captured image 60. If the target captured image 60 is displayed on the same display as the captured image 50 then it has an effective zoom of $M/m_2$ ($=N/n_2$).

In the illustrated example (transverse tracking only), the subset 54 of the pixels includes all of the available pixels within a sub-area of the captured image 50. That is there are no missing pixels. Changing the sub-set 54 involves selecting a new position of the sub-area within the captured image 50.

In the illustrated example, the new position of the sub-area within the captured image 50 is displaced from a previous position of the sub-area within the captured image 50 by the amount of relative movement of the sensor frame of reference 44 and the image frame of reference 56. The sub-area remains the same size.

The Figures illustrate that the processor 4 is configured to track the area of interest 30 when it moves relative to the camera sensor 10 by dynamically changing which sub-set 54 of pixels 52 are used to define the target captured image 60. The captured image comprises a N row by M column array of contiguous pixels and the processor 4 is configured to use only a n row by m column sub-array of contiguous pixels within the N×M array to define a n row by m column target captured image 60.

Tracking keeps the area of interest 30 within the target captured image 60 despite relative movement of the sensor frame of reference 44 and the image frame of reference 56. The area of interest 30 may in some embodiments be kept at a constant position within the target captured image 60, for example at the centre of the target captured image 60.

In the embodiment described with reference to FIGS. 6A to 7D, when there is relative movement of the sensor frame of reference 44 and the image frame of reference 56, the processor 4 dynamically controls which subset 44 of the multiple sensor elements 42 are used to capture the target captured image.

FIG. 6A represents an image 32 of the real-world at a first time.

FIG. 6B illustrates that only a subset 44 of the sensor elements 42 is operational. The camera sensor 10 comprises a N row by M column array 40 of contiguous sensor elements 42. The subset 44 is a n row by m column sub-set 44 of the array 40. The n row by m column sub-set 44 of the array 40 captures a portion of the image 32. The captured image 50 is illustrated in FIG. 6C.

FIG. 6C illustrates that the captured image 50 comprises a $n_1$ row by $m_1$ column array 54 of pixels 52 positioned at $(x_1, y_1)$ and providing a field of view $X_1 \times Y_1$. Each of the pixels 52 corresponds to a sensor element 42 in the sub-set 44 of the array 40 of sensor elements. The sub-set 54 has a pixel count of $n_1 * m_1$. The $n_1$ row by $m_1$ column array 54 of pixels 52 is a sub-set of the N row by M column array of pixels that would have been captured had the whole of the whole of the camera sensor 10 been used. FIG. 6D illustrates that the sub-set 54 of the pixels defines the target captured image 60. The target captured image 60 has an effective zoom of M/m (=N/n).

FIG. 7A represents an image 32 of the real-world at a second time shortly after the first time. The area of interest 30 has moved between the first time and the second time.

FIG. 7B illustrates that only a subset 44 of the sensor elements 42 is operational. The subset 44 is a $n_2$ row by $m_2$ column sub-set 44 of the array 40 of N rows and M columns of sensor elements 42. The $n_2$ row by $m_2$ column sub-set 44 of the array 40 captures a portion of the image 32. The captured image 50 is illustrated in FIG. 7C.

$N*M - n_2*m_2$ of the sensor elements 42 do not capture the image.

The processor 4 can automatically select a new sub-set 44 of the sensor elements 42 such that the area of interest 30 is included in the sub-set 44 despite having moved. The sub-set is an array of $n_2$ rows and $m_2$ columns of pixels 52 positioned at $(x_2, y_2)$ with a field of view $X_2 \times Y_2$. The sub-set 54 has a pixel count of $n_2 * m_2$.

If the processor 4 performs transverse tracking only, then $n_1 = n_2$, $m_1 = m_2$, $X_1 = X_2$, $Y_1 = Y_2$, and $(x_1, y_1) \neq (x_2, y_2)$. The sub-set 44 remains the same size (same field of view), has the same resolution (same pixel count) but is repositioned.

If the processor 4 performs depth tracking only, then $X_1 \neq X_2$, $Y_1 \neq Y_2$, $X_1/Y_1 = X_2/Y_2$ and $(x_1, y_1) = (x_2, y_2)$. The sub-set 44 remains at the same position but is re-sized (different field of view) while maintaining the same aspect ratio. The pixel count may remain the same $n_1 = n_2$, $m_1 = m_2$.

If the processor 4 performs transverse tracking and depth tracking, then $X_1 \neq X_2$, $Y_1 \neq Y_2$, $X_1/Y_1 = X_2/Y_2$ and $(x_1, y_1) \neq (x_2, y_2)$ The sub-set 44 changes size (different field of view) and is repositioned. The pixel count may remain the same $n_1 = n_2$, $m_1 = m_2$.

In the illustrated example (transverse tracking only), the subset 44 of the sensor elements 42 includes all of the available sensor elements 42 within a sub-area of the array 40 of sensor elements 42. That is there are no missing sensor elements. Changing the subset 44 involves selecting a new position of the sub-area within the array 40 of sensor elements 42.

In the illustrated example, the new position of the sub-area within the array 40 is displaced from a previous position of the sub-area within the array 40 by the amount of relative movement of the sensor frame of reference 44 and the image frame of reference 56. The sub-area remains the same size.

FIG. 7C illustrates that the captured image 50 comprises a $n_2$ row by $m_2$ column array 54 of pixels 52. Each of the pixels 52 corresponds to a sensor element 42 in the sub-set 44 of the array 40 of sensor elements 42. The $n_2$ row by $m_2$ column array 54 of pixels 52 is a sub-set of the N row by M column array of pixels that would have been captured had the whole of the whole of the camera sensor 10 been used.

The subset 54 of the pixels includes all of the available pixels within the captured image 50. That is there are no missing pixels.

FIG. 7D illustrates that the sub-set 54 of the pixels defines the target captured image 60. The target captured image 60 has an effective zoom of $M/m_2$ (=$N/n_2$).

The Figures illustrate that the processor 4 is configured to track the area of interest 30 when it moves relative to the camera sensor 10 by dynamically changing which sub-set 54 of pixels 52 are used to define the target captured image 60. In this embodiment, the processor 4 is configured to dynamically control which subset of the multiple sensor elements 42 are used to capture the image.

The processor 4 is configured to use only a n row by m column sub-array of contiguous sensor elements to define a n row by m column target captured image 60. The captured image comprises a n row by m column sub-set of a potential N row by M column array of contiguous pixels.

Tracking keeps the area of interest 30 within the target captured image 60 despite relative movement of the sensor frame of reference 44 and the image frame of reference 56. The area of interest 30 may in some embodiments be kept at a constant position within the target captured image 60, for example at the centre of the target captured image 60.

Figure 8A:
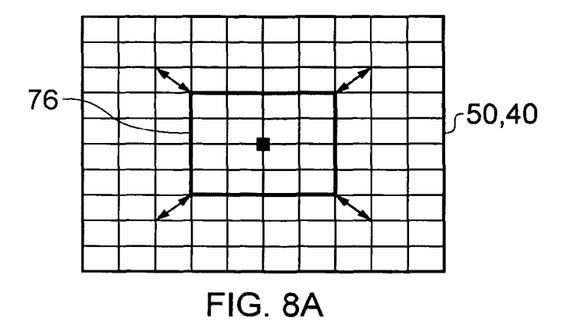
FIGS. 8A, 8B and 8C illustrate examples of how a field of view for a target captured image can be changed.
Figure 8B:
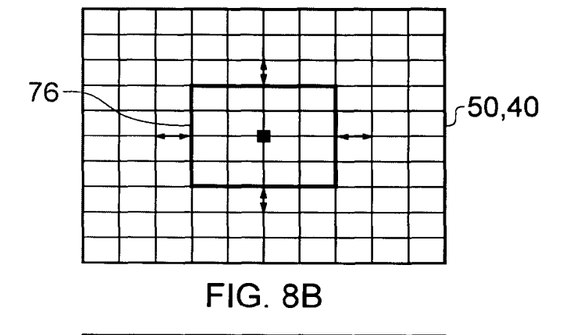
Figure 8C:
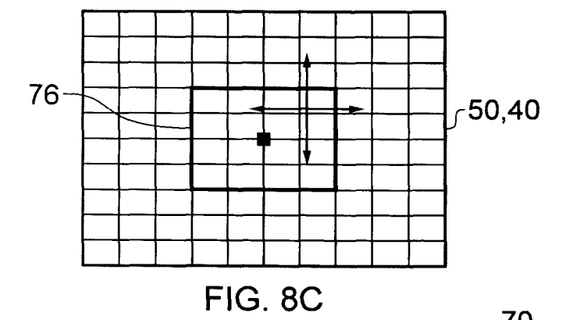

FIGS. 8A, 8B and 8C schematically illustrate how a user determines a size (resolution) of the target captured image 60. In these examples, the n row by m column array of pixels used to define the size of the target captured image 60 is delineated using a frame 76 in a N row by M column array of pixels provided by the camera sensor 10.

In FIG. 8A, the size of the n row by m column array of pixels can be increased or decreased while maintaining a constant aspect ratio (m/n) by moving a corner of the frame 76 outwards or inwards. The pixel count n*m changes as the frame size changes.

In FIG. 8B, the size of the n row by m column array of pixels can be increased or decreased without maintaining a constant aspect ratio (m/n) by moving an edge of the frame 76 outwards or inwards. The pixel count n*m changes as the frame size changes.

In FIG. 8C, the n row by m column array of pixels can be repositioned by moving the frame 76. The pixel count n*m remains the same.

Figure 9:
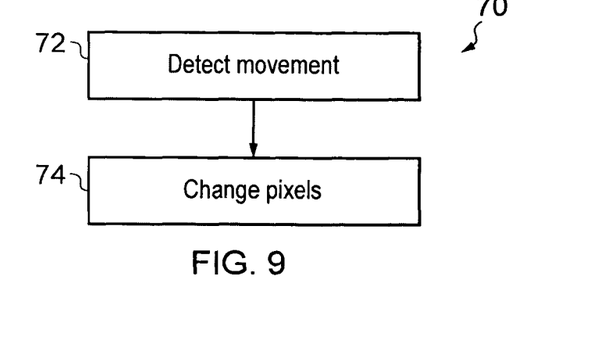
FIG. 9 illustrates an example of a method for automatically tracking an area of interest such that it remains within a target captured image.

FIG. 9 schematically illustrates a method 70.

The method may be used to automatically track an area of interest 30 such that it remains within a target captured image 60 and/or remains at the same scale. This is achieved by controlling which subset 54 of available pixels is used to define the target captured image. The selection of the sub-set 54 may occur pre-capture by selecting a sub-set 44 of sensor elements used to capture the image or post-capture by selecting a sub-set 54 of the already captured pixels 52. The selection of the sub-set 54 may occur as part of a transverse tracking process. The selection of the sub-set 54 may occur as part of a depth tracking process.

At block 72, relative movement of a sensor frame of reference 44 defined by the camera sensor 10 and an image frame of reference 56 defined by the image is detected.

Such detection may be achieved in a number of ways. For example, computer vision techniques may be used to track movement of the area of interest 30.

As an example, when the area of interest 30 is initially defined the image content of the area of interest may be processed to determining a reference spatial distribution of interest points within the area of interest. The interest points may, for example, be defined by significant contrast or color differences between adjacent pixels. The image frame of reference 56 may be defined by this reference spatial distribution of interest points. At a later time, content of a later image may be processed to identify interest points. The new spatial distribution of interest points in the later image may be compared against the reference spatial distribution of interest points to determine a location of the reference distribution of interest points within the new spatial distribution of interest points. This location provides the location of the image frame of reference 56 relative to the sensor frame of reference 44.

Further details are provided, for example, in "Multiple View Geometry in computer vision" by Richard Hartley et al ($2^{nd}$ edition), which at Chapter 4 describes the calculation of a 2D homography at s.4.8 and provides an algorithm 4.6 page 123.

At block 74, in response to detected relative movement, there is an automatic change in which a sub-set 54 of pixels 52 is used to define a target captured image 60.

The image frame of reference 56 may be defined by an area of interest 30 within the image. The area of interest 30 is tracked when it moves relative to the camera sensor 10 by dynamically changing which pixels are used to define the target captured image 60. The target captured image 60 consequently includes the area of interest 30 despite relative movement of the sensor frame of reference 44 and the image frame of reference 56.

According to one embodiment, block 74 may comprise dynamically controlling which subset 44 of multiple sensor elements 42 of a camera sensor 10 are used to capture an image.

According to one embodiment, block 74 may comprise dynamically controlling which pixels 54 of a captured image 50 are used to define a smaller target captured image 60.

According to various embodiments, block 74 may enable transverse tracking and/or depth tracking.

The processor 4 may be configured to control automatically which pixels 52 are used to define a target captured image 60 in a series of target captured images 60. The processor 4 is then configured to determine automatically which pixels are used to define each target captured image 60 in the series in response to relative movement of a sensor frame of reference and an image frame of reference during the series. The region of interest 30 can thus be tracked during the sequence of captured images without moving the apparatus 2.

Implementation of processor 4 can be in hardware alone (a circuit, a microprocessor etc, have certain aspects in software including firmware alone or can be a combination of hardware and software (including firmware).

The processor may be implemented using instructions that enable hardware functionality, for example, by using executable computer program instructions in a general-purpose or special-purpose processing unit that may be stored on a computer readable storage medium (disk, memory etc) to be executed by such a processing unit.

Figure 10A:
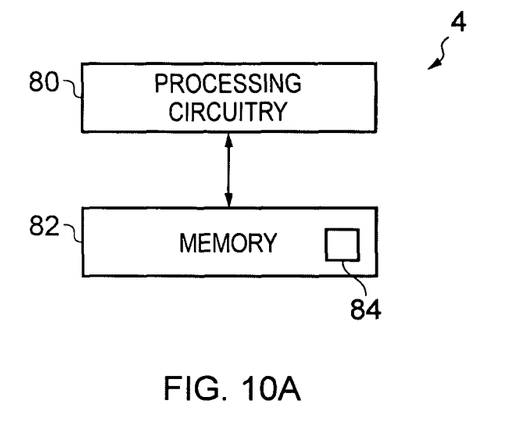
FIG. 10A illustrates an example of a processor.

Referring to FIG. 10A, the processor 4 may comprise processing circuitry 80 that is configured to read from and write to a memory 82. The processing circuitry 80 may also comprise an output interface via which data and/or commands are output by the processor 4 and an input interface via which data and/or commands are input to the processor 4.

The memory 82 may store a computer program 84 comprising computer program instructions that control the operation of the processor 4 when loaded into the processing circuitry 80. The computer program instructions provide the logic and routines that enables the processor 4 to perform the methods illustrated in FIGS. 4A-4D, 5A-5D, 6A-6D, 7A-7D, 8A-8C and 9. The processing circuitry 80 by reading the memory 82 is able to load and execute the computer program 84.

The apparatus 2 may therefore comprises: at least one processor; and at least one memory including computer program code
the at least one memory and the computer program code configured to, with the at least one processor, cause the apparatus at least to perform:
detecting relative movement of a sensor frame of reference defined by the camera sensor and an image frame of reference defined by the image;
in response to detected relative movement, changing automatically which pixels are used to define a target captured image.

Figure 10B:
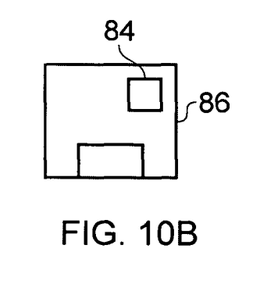
FIG. 10B illustrates an example of a carrier embodying a computer program.

Referring to FIG. 10B, the computer program 84 may arrive at the processor 4 via any suitable delivery mechanism 86. The delivery mechanism may be, for example, a non-transitory computer-readable storage medium, a computer program product, a memory device, a record medium such as a compact disc read-only memory (CD-ROM) or digital versatile disc (DVD), an article of manufacture that tangibly embodies the computer program. The delivery mechanism may be a signal configured to reliably transfer the computer program. The apparatus may propagate or transmit the computer program as a computer data signal.

Although the memory 82 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device."

As used here 'module' refers to a unit or apparatus that excludes certain parts/components that would be added by an end manufacturer or a user.

The blocks illustrated in the FIG. 9 may represent steps in a method and/or sections of code in the computer program 84. The illustration of a particular order to the blocks does not necessarily imply that there is a required or preferred order for the blocks and the order and arrangement of the block may be varied. Furthermore, it may be possible for some blocks to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. An apparatus comprising:
a camera sensor configured to capture at least one target captured image and comprising an array of sensor elements; and
a processor configured to:
define a first sub-area of the array of sensor elements and a remaining sub-area of the array of sensor elements comprising the area of the array of sensor elements not comprised in the first sub-area of the array of sensor elements;
at a first time, enable image capture using all sensor elements within the first sub-area of the array of sensor elements and no image capture using any sensor elements within the remaining sub-area of the array of sensor elements;
displace the whole of the first sub-area of the array of sensor elements within of the array of sensor elements in response to relative movement of:
a sensor frame of reference, defined by the camera sensor; and
an image frame of reference, defined by an image;
in response to displacement of the first sub-area of the array of sensor elements, redefine the remaining sub-area of the array of sensor elements comprising the area of the array of sensor elements not comprised in the displaced first sub-area of the array of sensor elements; and
at a second time, enable image capture using all sensor elements within the displaced first sub-area of the array of sensor elements and no image capture using any sensor elements within the redefined remaining sub-area of the array of sensor elements.

2. An apparatus as claimed in claim 1, wherein the camera sensor is configured to capture an image as a plurality of pixels.

3. An apparatus as claimed in claim 1, wherein the processor is configured to track an area of interest when it moves relative to the camera sensor by displacing the whole of the first sub-area of the array of sensor elements within the array of sensor elements.

4. An apparatus as claimed in claim 3, wherein the processor is configured to track the area of interest with a constant scale.

5. An apparatus as claimed in claim 3, wherein the processor is configured to keep the area of interest at a constant position within the target captured image.

6. An apparatus as claimed in claim 3, wherein the apparatus is configured to enable user definition of the area of interest.

7. An apparatus as claimed in claim 1 wherein the camera sensor and the processor are housed in a hardware module.

8. An apparatus as claimed in claim 1, wherein the camera sensor is housed in a module separate to the processor.

9. An apparatus as claimed in claim 1, wherein the camera sensor is configured to capture a first target captured image at the first time and capture a second target captured image at the second time or to not capture a first target captured image at the first time and capture a second target captured image at the second time.

10. An apparatus as claimed in claim 1, wherein the processor is further configured to enable resizing of the first sub-area within the array.

11. An apparatus comprising:
a camera sensor configured to capture a target captured image and comprising an array of sensor elements; and
a processor configured to:
define a first sub-area of the array of sensor elements and a remaining sub-area of the array of sensor elements comprising the area of the array of sensor elements not comprised in the first sub-area of the array of sensor elements;
at a first time, enable image capture using all sensor elements within the first sub-area of the array of sensor elements and no image capture using any sensor elements within the remaining sub-area of the array of sensor elements;
automatically track an area of interest such that it remains within a target captured image by displacing the whole of the first sub-area of the array of sensor elements within the array of sensor elements;
in response to displacement of the first sub-area of the array of sensor elements, redefine the remaining sub-area of the array of sensor elements comprising the area of the array of sensor elements not comprised in the displaced first sub-area of the array of sensor elements; and
at a second time, enable image capture using all sensor elements within the displaced first sub-area of the array of sensor elements and no image capture using an sensor elements within the redefined remaining sub-area of the array of sensor elements.

12. A method comprising:

defining a first sub-area of an array of sensor elements of a camera sensor and a remaining sub-area of the array of sensor elements comprising the area of the array of sensor elements not comprised in the first sub-area of the array of sensor elements;

at a first time, enabling image capture using all sensor elements within the first sub-area of the array of sensor elements and no image capture using any sensor elements within the remaining sub-area of the array of sensor elements;

detecting relative movement of a sensor frame of reference defined by the camera sensor and an image frame of reference defined by an image;

in response to detected relative movement, displacing the whole of the first sub-area of the array of sensor elements within the array of sensor elements;

in response to displacement of the first sub-area of the array of sensor elements, redefining the remaining sub-area of the array of sensor elements comprising the area of the array of sensor elements not comprised in the displaced first sub-area of the array of sensor elements; and at a second time, enabling image capture using all sensor elements within the displaced first sub-area of the array of sensor elements and no image capture using any sensor elements within the redefined remaining sub-area of the array of sensor elements.

13. A method as claimed in claim 12, wherein the image frame of reference is defined by an area of interest within the image and the target captured image includes the area of interest despite relative movement of the sensor frame of reference and the image frame of reference.

14. A method as claimed in claim 12, comprising:

tracking the area of interest when it moves relative to the camera sensor by displacing the whole of the first sub-area of the array of sensor elements within the array of sensor elements.

15. A method as claimed in claim 12, wherein the camera sensor is configured to capture a first target captured image at the first time and capture a second target captured image at the second time or to not capture a first target captured image at the first time and capture a second target captured image at the second time.

16. A method as claimed in claim 12, further comprising resizing the first sub-area within the array in response to detected relative movement.

17. A method comprising:

defining a first sub-area of an array of sensor elements of a camera sensor and a remaining sub-area of the array of sensor elements comprising the area of the array of sensor elements not comprised in the first sub-area of the array of sensor elements;

at a first time, enabling image capture using all sensor elements within the first sub-area of the array of sensor elements and no image capture using any sensor elements within the remaining sub-area of the array of sensor elements;

automatically tracking an area of interest such that it remains within captured video images by displacing the whole of the first sub-area within the array;

in response to displacement of the first sub-area of the array of sensor elements, redefining the remaining sub-area of the array of sensor elements comprising the area of the array of sensor elements not comprised in the displaced first sub-area of the array of sensor elements; and at a second time, enabling image capture using all sensor elements within the displaced first sub-area of the array of sensor elements and no image capture using any sensor elements within the redefined remaining sub-area of the array of sensor elements.

* * * * *

UNITED STATES PATENT AND TRADEMARK OFFICE
CERTIFICATE OF CORRECTION

| | | |
|---|---|---|
| PATENT NO. | : 9,219,857 B2 | Page 1 of 1 |
| APPLICATION NO. | : 13/333284 | |
| DATED | : December 22, 2015 | |
| INVENTOR(S) | : Eldon | |

It is certified that error appears in the above-identified patent and that said Letters Patent is hereby corrected as shown below:

In the claims

Claim 11, col. 13, line 1 "an" should be deleted and --any-- should be inserted.

Signed and Sealed this
Seventeenth Day of May, 2016

Michelle K. Lee
*Director of the United States Patent and Trademark Office*